2,907,717
BREAKING CRUDE OIL EMULSIONS

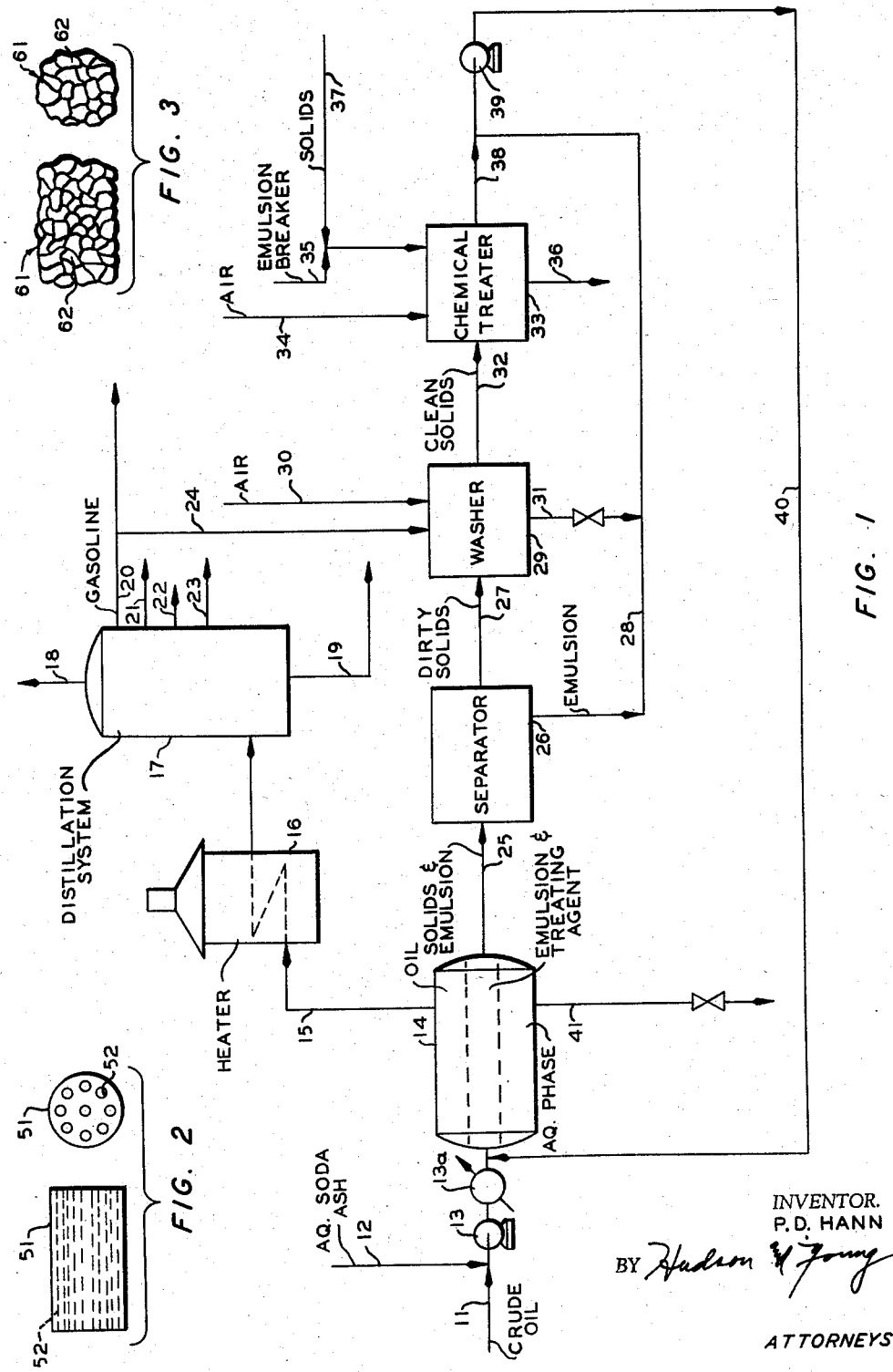

Paul D. Hann, Bartlesville, Okla., assignor to Phillips Petroleum Company, a corporation of Delaware Application January 3, 1957, Serial No. 632,348

7 Claims. (Cl. 252—325)

This invention relates to breaking of crude oil emulsions. In one aspect it relates to breaking of crude oil emulsions by employing a carrier for the emulsion-breaking agent. In another aspect it relates to a process for breaking crude oil emulsions by mixing a particulate material impregnated with an emulsion-breaking agent into an emulsion layer in a crude oil-water phase separation vessel.

In conventional processes for chemically desalting crude oils, an emulsion-breaking chemical is usually added to the entire crude oil. Following the addition of emulsion-breaking agent, an aqueous soda ash solution is added to neutralize acidic components in case the oil has been produced from one or more acidized wells. The mixture of crude oil, soda ash solution and emulsion-breaking agent is ordinarily heated to a temperature of about 200° F. and under sufficient pressure to maintain liquid phase operation. Such an aqueous soda ash solution, under some conditions, contains about 4 pounds of soda ash per barrel of water. In case salt in the crude oil is wax coated, the aforementioned temperature tends to dissolve the wax from the salt crystals thereby allowing the salt to dissolve in the aqueous soda ash. Crude oils from acidized wells, as is known, contain such acid constituents as hydrochloric acid, calcium chloride and magnesium chloride. The soda ash is intended to neutralize the acid and these acid forming constituents. In many instances the ratio of crude oil to the soda ash solution in prior art practice is about 25 barrels of oil per barrel of soda ash solution. The mixture of soda ash solution, emulsion-breaking agent and crude oil is mixed by conventional means and the mixture passed to a phase separating drum or tank. From this separator a crude oil and an aqueous phase are removed. In case the emulsion is difficult to break, various and sundry methods have been devised for further treatment of the emulsion.

An object of my invention is to provide a process for breaking crude oil emulsions.

Another object of my invention is to provide an easily operable and efficient process for breaking crude oil emulsions.

Another object of my invention is to provide such a process for breaking crude oil emulsions which requires less emulsion-breaking agent than used in the prior art.

Still another object of my invention is to provide a process for breaking crude oil emulsions generally considered difficult to break.

Still other objects and advantages of my invention will be realized upon reading the following description which, taken with the attached drawing, forms a part of this specification.

In the drawing:

Figure 1 illustrates, in diagrammatic form, an arrangement of apparatus parts of which to carry out the process of my invention.

Figure 2 illustrates a side view and an end view of a material employed in practicing my invention.

Figure 3 illustrates a side view and an end view of an alternate material used in practicing my invention.

My invention is directed particularly to a method for breaking an aqueous crude oil emulsion comprising introducing crude oil containing said emulsion into a settling zone, introducing a crude oil and water insoluble solid material into said settling zone, said solid material having an extended surface and being impregnated with a water-in-oil emulsion-breaking agent, said solid material also having a specific gravity intermediate that of water and the crude oil being processed, and withdrawing a crude oil and an aqueous phase from said zone as separate products.

Referring now to the drawing and specifically to Figure 1, reference numeral 11 identifies a pipe which transports crude oil, from a source not shown, to the apparatus of my invention. A pipe 12 conducts an aqueous soda ash solution, also from a source not shown, to the crude oil flowing through pipe 11. The crude oil and the soda ash solution are thoroughly mixed in a mixing device 13, such as a pump. If desired, the mixed liquids are heated in a heater 13a to such a temperature as, for example, 200° F. This temperature ordinarily is sufficient for completing reaction between the soda ash solution and the acidic constituents of the oil and for promoting solution of wax from salt crystals and of the salt content of the oil in the aqueous phase. This heated solution is passed into a phase separation vessel 14, which is preferably a horizontally disposed separating tank. Separated crude oil rises to the top of the tank while the aqueous phase, of course, settles to the bottom. In case any of the crude oil emulsion is not immediately broken, it separates as a separate phase of intermediate gravity between the crude oil phase and the aqueous phase.

To expedite breaking of the emulsion I add a solid material, which is insoluble in water and insoluble in the oil and which possesses a relatively large surface area per unit of weight, into the separation vessel 14. This solid material is previously impregnated with a water-in-oil emulsion-breaking agent and the impregnated material is introduced into the separator tank 14 from a pipe 40. Since the specific gravity of the impregnated solid material is between that of the aqueous phase and that of crude oil, the emulsion-breaking agent is maintained in the emulsion and at the point of need. For example, if the aqueous soda ash solution has a specific gravity slightly greater than 1 and the crude oil has a specific gravity of 0.9, the emulsion-breaking agent impregnated solid should have a specific gravity of about 0.95. Since the emulsion is a mixture of the aqueous phase and oil, it is obvious that its specific gravity will be intermediate that of its components, and the emulsion phase, accordingly, can then exist as a separate layer between the oil and aqueous phases. By employing an impregnated solid material having a specific gravity between that of the crude oil and water, this solid material remains entrained in the emulsion phase. In this manner the emulsion-breaking agent is maintained in the emulsion phase thereby making certain that the emulsion-breaking agent contacts the emulsion. This point is in contrast to prior art in which the emulsion-breaking agent is ordinarily mixed with the entire volume of crude oil being processed. Thus, according to my invention, emulsion-breaking agent is maintained with the emulsion to be broken and not with the entire body of crude oil to be treated. For example, in case 2 barrels of emulsion result from each 100 barrels of crude oil, the emulsion-breaking agent remains largely in this 2 barrels of emulsion and it is thus not diluted with the entire 100 barrels of crude oil. It is thus realized that my process places the emulsion-breaking agent at the point of need.

Occasionally a crude oil is treated in which a final portion of the emulsion is very difficult to break and in that case the emulsion remaining between the oil and aqueous phases, along with used treating agent of my invention, is removed from the phase separating vessel 14 by way of a pipe 25 and is introduced into a separator 26. This separator 26 is a filter or centrifuge or any suitable separating means whereby emulsion is separated from the solid material. The solid material, separated from emulsion, is passed on through a pipe 27 into a washer apparatus 29 in which a petroleum distillate, such as a gasoline, is contacted with the solid material to wash away at least a major portion of adhering emulsion. Washings are removed through a pipe 31, the disposal of which will be stated hereinafter. Washed solid material, depleted or at least partially depleted in emulsion-breaking agent, is removed from washer 29 as clean solids and is passed through a pipe 32 into a chemical treater unit 33. In this unit the clean solid material is reimpregnated with emulsion-breaking agent. This emulsion-breaking agent is passed from a source, not shown, through a pipe 35 into the chemical treater 33. In case it is desired to dry, partly or completely, the washed solid material prior to impregnation with emulsion-breaking agent, air or other suitable drying gas is passed, from a source not shown, through a pipe 34 into the treater unit 33. This chemical treater unit 33 can be one vessel or, if desired, it can be a separate drying vessel and another vessel for carrying out the impregnation operation. Solid material for starting up the operation and makeup solids required are passed, from a source not shown, through a pipe 37 into vessel 33. Excess emulsion-breaking agent not absorbed by the solid material is removed from vessel 33 through a pipe 36. This liquid is returned to an emulsion breaker liquid storage vessel, not shown, or it is reintroduced directly into the treater, if desired. Impregnated solid material suitable for reintroduction into the phase separating tank 14 is removed from vessel 33 by way of a conduit 38 and is passed under the influence of a transfer means 39 via conduit 40 to vessel 14. Emulsion separated from the previously used solid material in separator 26 is passed from separator 26 by way of a pipe 28 and is added to the newly impregnated solid material in conduit 38 and this mixture is then transferred along with impregnated solid material through pipe 40 for readdition to the phase separator tank 14.

The emulsion-free crude oil phase from tank 14 is passed therefrom via pipe 15 for such disposal as desired, as, for example, it is passed to storage, or it is passed to a pipe line or pipe line transportation, or it is passed to a distillation system such as herein illustrated. When passed to a distillation system, the oil from pipe 15 is passed through a heater 16 and on to a distillation system 17 from which gas is removed through a pipe 18, and a gasoline fraction, a kerosene fraction, a distillate fraction and a fuel oil fraction are removed by way of conduits 20, 21, 22 and 23, respectively. Crude oil residue or topped crude oil is removed through a pipe 19 to such disposal as desired. As illustrated in the drawing, a gasoline fraction so separated is passed from pipe 20 through a pipe 24 to the washer apparatus 29 for washing adhering emulsion from the used solid material. These washings of gasoline and emulsion are passed through pipe 31 to pipe 28 in which is flowing separated emulsion from separator 26, and this mixture then flows on through pipe 28 for mixing with the freshly impregnated solid material in conduit 38. Aqueous phase which contains salt and neutralized acidic constituents from the crude oil is removed from the separator 14 through a pipe 41 for such disposal as desired.

The solid material which is impregnated with emulsion-breaking agent for use in my process is illustrated in very diagrammatic forms in Figures 2 and 3. This material is, in some cases, a plastic material such as a polyethylene, polystyrene, or other similar material. Such a material is formed into the shape of a rod containing longitudinally disposed openings. This type of material is cut or otherwise formed into short lengths such as identified by reference numeral 51 and containing longitudinal openings 52, illustrated in Figure 2. This form of material is substantially a short solid cylinder containing a plurality of longitudinally disposed openings or pores. These openings or pores 52 are intended to add surface to the solid material for providing extended surface for promoting more efficient contact between the emulsion-breaking agent wetting the surface of the solid material, and the crude oil emulsion to be broken.

An alternate form of solid material is illustrated in Figure 3. This material of Figure 3 is a cellular material 61 with its pores 62, or at least a portion of its pores, interconnected or not interconnected, as desired. In case at least a portion of the pores are interconnected, the material has a considerably larger surface area for wetting with the emulsion-breaking agent than when pores are not interconnected. This material, as illustrated in Figure 3, is, in some cases, a sponge material such as a plastic, for example, a sponge polyethylene, or a type of sponge rubber or rubberlike material which, of course, is insoluble in the crude oil being treated. This rubber or rubberlike material should preferably not even be swollen by the crude oil being treated.

Such a material as a polyethylene, in some cases, possesses a specific gravity of about 0.95. Granular material of such a resin or polyethylene possessing the specific gravity of about 0.95 is suitable without modification for impregnation with emulsion-breaking agent as herein disclosed. However, in case cellular material, such as that illustrated in Figure 3, is used, the apparent specific gravity of such material will ordinarily be very low, that is, of the order of about 0.2 or 0.3. In this case a weighting material such as iron filings should be incorporated in the material during its manufacture so that its apparent gravity will be intermediate that of water and the crude oil to be treated.

For preparing a suitable cellular material, such as that illustrated in Figure 3, for use in the present process, a polyethylene plastic material having a density of about 0.95 is, in some cases, used. When this plastic material is made cellular in form, conventional methods of manufacture are used. Sufficient iron filings are previously mixed with this plastic material so that one cubic centimeter of the final porous plastic material contains about 0.61 grams of the iron filings. This composition then has an apparent specific gravity slightly above about 0.9 and can be used for treating a crude oil having a specific gravity of 0.9 or less. It is obvious that the apparent specific gravity of the cellular material can be adjusted to any desired value merely by regulating the addition of the weighting material. Such a porous plastic material can take up about 1/10 cubic centimeter of liquid emulsion-breaking agent per cubic centimeter of porous plastic material.

When using such a material in the process of my invention, I employ about 2½ cubic feet of the impregnated porous material per 100 barrels of crude oil. This amount of impregnated porous material contains approximately 1.8 gallons of liquid emulsion-treating agent. Accordingly, I use about 1.8 gallons of a suitable water-in-oil emulsion-breaking agent for breaking a crude oil emulsion on contrast to prior art processes which require about 2.0 gallons of the same emulsion-breaking agent per 100 barrels of crude oil.

An emulsion-breaking agent which is suitable for use according to my invention is a water-soluble salt of an alkyl-substituted sulfo-ester of a fatty acid. When using this material, only 1.8 gallons are required to do the same job as two gallons of the chemical when using prior art processes.

When using the type of granular solid material illustrated in Figure 2, with the material being, for example, polyethylene, specific gravity adjustment may not be needed because many polyethylenes have a specific gravity slightly less than that of water.

As mentioned above, the use of the process of my invention requires less emulsion-breaking chemical than when using prior art processes of adding the chemical to the entire quantity of crude oil being treated because I add the chemical impregnated solid material in such a manner that the chemical is contacted substantially with only the emulsion to be broken and not with the entire volume of crude oil. Another advantage is that the large, extended surface of the granular solid material impregnated with the emulsion-breaking agent provides a large surface of contact between the emulsion-breaking agent and the emulsion to be broken in the emulsion layer in such a treating vessel as vessel 14, thus resulting in efficient and rapid action between the emulsion-breaking agent and the emulsion. Another advantage is that by so selectively contacting the emulsion with emulsion-breaking agent, more rapid resolution of the emulsion is attained. There is, accordingly, less carry over of emulsion with the separated crude oil. As is well known, it is desired to have a minimum of emulsion carry over with the crude oil because water in a crude oil heater prior to distillation results in formation of a steam phase in the heater tubes with the possibility of overheating of the tubes.

While one specific type of water-in-oil emulsion-breaking agent was disclosed, specific emulsion-breaking agents will not be discussed in detail because there are many emulsion-breaking agents available in commerce for breaking crude oil emulsions. The particular emulsion-breaking agent to be used with any given crude oil is not a part of my invention and I will not disclose in detail the composition of any of these reagents since any given crude oil frequently requires a specific emulsion-breaking agent and the particular emulsion-breaking agent to be used with a given crude oil is preferably determined by experiment. Likewise, I will not discuss the percentage or relative amounts of emulsion-breaking agents to be used other than to point out that my process requires less emulsion-breaking agent than prior art processes, because the amounts ordinarily required will be dependent upon the emulison-breaking agent employed, the particular crude oil and the particular type of emulsion to be broken and on such other conditions as temperatures and pressures, etc., maintained in the system. It is obvious also that ordinarily if it is desired for an emulsion to be broken more rapidly, it is merely necessary to use a larger proportion of the emulsion-breaking agent. However, according to my invention, there is a distinct advantage because the emulsion-breaking agent is maintained within the emulsion phase, that is, at its point of need. Because the emulsion-breaking agent is kept at its point of need, and due to the extended surfaces of the solid material, my process requires less emulsion-breaking agent than prior art processes which mix the emulsion-breaking agent with the entire volume of crude oil to be treated.

Such auxiliary apparatus as valves, pressure and temperature indicating and control apparatus are not herein disclosed, for purposes of brevity. It is realized by those skilled in such art that such auxiliary apparatus is needed. The installation, maintenance and operation of such auxiliary apparatus are also well understood by those skilled in the art.

While certain embodiments of the invention have been described for illustrative purposes, the invention obviously is not limited thereto.

I claim:

1. A method for breaking an aqueous crude oil emulsion comprising introducing crude oil containing said emulsion into a settling zone, introducing into said settling zone a crude oil and water insoluble solid material selected from the group consisting of polyethylene and polystyrene, said solid material having an extended surface and being impregnated with a water-in-crude-oil emulsion-breaking agent, said solid material also having a specific gravity intermediate that of water and the crude oil being processed, and withdrawing a crude oil and an aqueous phase from said zone as separate products.

2. A method for breaking a water-in-oil aqueous crude oil emulsion comprising introducing crude oil containing said emulsion into a phase separation zone, introducing into said settling zone a crude oil and water insoluble solid material selected from the group consisting of polyethylene and polystyrene, said solid material having an extended surface and being impregnated with a water-in-crude-oil emulsion-breaking agent, said solid material also having a specific gravity intermediate that of water and the crude oil being processed, withdrawing unbroken emulsion and said solid material from said zone and withdrawing crude oil and an aqueous phase from said zone as separate products.

3. A method for breaking a water-in-oil aqueous crude oil emulsion comprising introducing crude oil containing said emulsion into a phase separation zone, introducing into said phase separation zone a crude oil and water insoluble solid material selected from the group consisting of polyethylene and polystyrene, said solid material having an extended surface and being impregnated with a water-in-crude-oil emulsion-breaking agent, said solid material having a specific gravity intermediate that of water and the crude oil being processed, withdrawing unbroken emulsion and said solid material partially depleted of said emulsion-breaking agent from said zone, separating the unbroken emulsion from said solid material of the withdrawn emulsion and solid material, impregnating the separated solid material with said emulsion-breaking agent and introducing this impregnated solid material into said separation zone as the aforementioned solid material impregnated with said emulsion-breaking agent, and withdrawing a separated crude and an aqueous phase as separate products from the aforementioned phase separation zone.

4. The method of claim 1 wherein said crude oil and water insoluble material comprises polyethylene.

5. The method of claim 1 wherein said crude oil and water insoluble material comprises polystyrene.

6. A method for breaking a water-in-oil aqueous crude oil emulsion comprising introducing crude oil containing said emulsion into a phase separation zone, introducing into said phase separation zone a crude oil and water insoluble solid material selected from the group consisting of polyethylene and polystyrene, said solid material having an extended surface and being impregnated with a water-in-crude-oil emulsion-breaking agent, said solid material having a specific gravity intermediate that of water and the crude oil being processed, withdrawing unbroken emulsion and said solid material partially depleted of said emulsion-breaking agent from said zone, separating the unbroken emulsion from said solid material of the withdrawn emulsion and solid material, washing the separated solid material with a petroleum distillate, impregnating the washed solid material with said emulsion-breaking agent, combining the unbroken emulsion separated from said solid material and the petroleum distillate washings with the impregnated washed solid material, introducing this combined material into said phase separation zone as the first-mentioned crude oil and water insoluble material impregnated with said emulsion-breaking agent, and withdrawing separated crude oil and an aqueous phase from said separation zone as separate products of the operation.

7. The method of claim 6 wherein said crude oil and water insoluble material comprises polyethylene.

References Cited in the file of this patent

UNITED STATES PATENTS

| | | |
|---|---|---|
| 2,015,260 | De Groote | Sept. 24, 1935 |
| 2,503,014 | Weber | Apr. 4, 1950 |
| 2,542,147 | Krewer et al. | Feb. 20, 1951 |